(12) United States Patent
Bücker et al.

(10) Patent No.: US 7,321,221 B2
(45) Date of Patent: Jan. 22, 2008

(54) METHOD FOR OPERATING A WIND POWER PLANT AND METHOD FOR OPERATING IT

(75) Inventors: Andreas Bücker, Hasbergen (DE); Wilhelm Janssen, Saterland (DE); Henning Lütze, Bad Bentheim (DE)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/521,614

(22) PCT Filed: Jul. 17, 2003

(86) PCT No.: PCT/EP03/07776

§ 371 (c)(1),
(2), (4) Date: Feb. 10, 2006

(87) PCT Pub. No.: WO2004/008627

PCT Pub. Date: Jan. 22, 2004

(65) Prior Publication Data

US 2006/0163881 A1   Jul. 27, 2006

(30) Foreign Application Priority Data

Jul. 17, 2002 (DE) .............................. 102 32 423

(51) Int. Cl.
*H20P 9/00* (2006.01)

(52) U.S. Cl. ............................ 322/44; 322/55; 322/43; 322/54; 322/25

(58) Field of Classification Search ................. 290/44, 290/55, 43, 54, 1; 322/25, 29, 32
See application file for complete search history.

(56) References Cited

U.S. PATENT DOCUMENTS 3,483,463 A    12/1969  Smith (Continued)

FOREIGN PATENT DOCUMENTS

EP          1 104 091 A     5/2001

OTHER PUBLICATIONS

Warneke, O.: "Einsatz einer doppelgespeisten Asynchronmaschine in der grossen Windenergieanlage Growian" SIEMENS-ENERGIETECHNIK, vol. 5, No. 6, 1983, pp. 364-367, XP008024580.

(Continued)

*Primary Examiner*—Darren Schuberg
*Assistant Examiner*—Iraj A. Mohandesi
(74) *Attorney, Agent, or Firm*—Blakely, Sokoloff, Taylor & Zafman LLP

(57) ABSTRACT

A method of operating a wind turbine, wherein the wind turbine may include rotor windings of an induction generator, which includes stator coils coupled to a voltage grid, fed with rotor currents by a feed-in unit are driven by a rotor of the wind turbine; wherein the frequencies of the fed-in rotor currents are controlled depending on the rotor rotation frequency and the feed-in unit is electrically decoupled from the rotor windings in the case predetermined variations of the grid voltage amplitude and the rotor current feed-in is resumed after the decoupling caused by the variation of the grid voltage amplitude, when the currents generated in the motor windings by the variation have declined to a predetermined value.

19 Claims, 2 Drawing Sheets

U.S. PATENT DOCUMENTS

Figure 1:
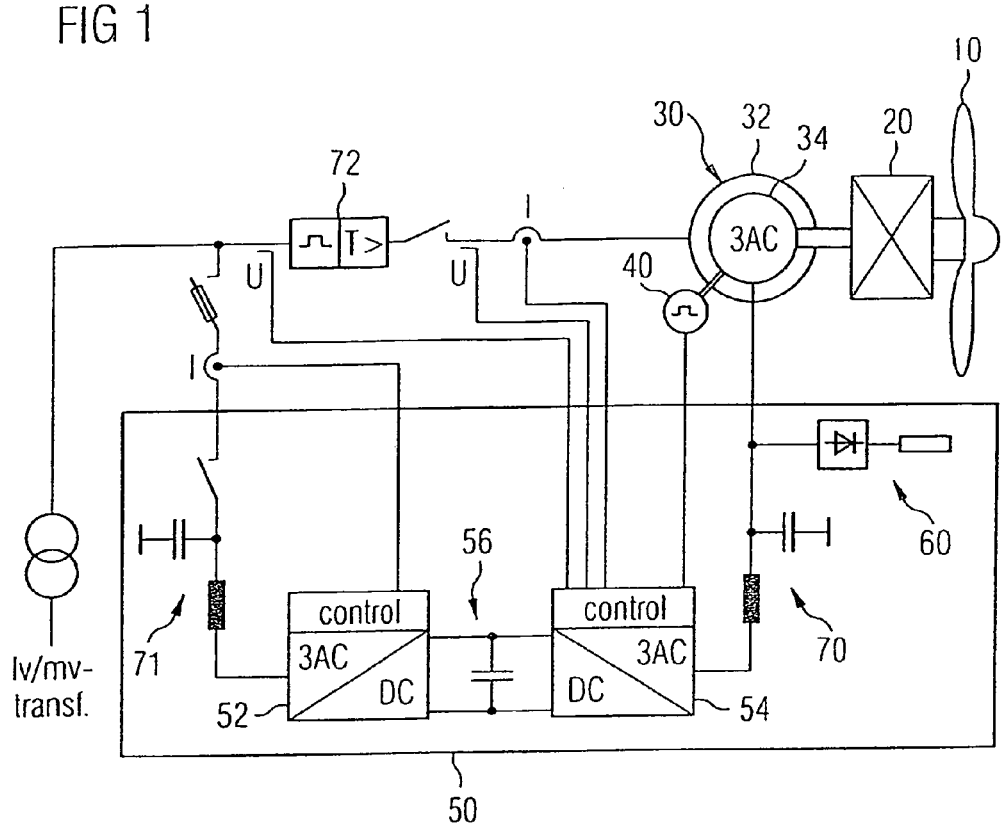

| | | | | |
|---|---|---|---|---|
| 4,357,542 A | * | 11/1982 | Kirschbaum | 290/44 |
| 4,461,957 A | * | 7/1984 | Jallen | 290/44 |
| 4,565,929 A | * | 1/1986 | Baskin et al. | 290/44 |
| 5,083,039 A | * | 1/1992 | Richardson et al. | 290/44 |
| 5,225,712 A | * | 7/1993 | Erdman | 290/44 |
| 5,798,631 A | * | 8/1998 | Spee et al. | 322/25 |
| 5,798,632 A | * | 8/1998 | Muljadi | 322/29 |
| 6,137,187 A | * | 10/2000 | Mikhail et al. | 290/44 |
| 6,285,533 B1 | | 9/2001 | Sakamoto | |
| 6,420,795 B1 | * | 7/2002 | Mikhail et al. | 290/44 |
| 6,566,764 B2 | * | 5/2003 | Rebsdorf et al. | 290/44 |

OTHER PUBLICATIONS

PCT International Search Report for PCT Appln No. PCT/EP 03/07776, mailed Nov. 19, 2003 (4 pages).

* cited by examiner

METHOD FOR OPERATING A WIND POWER PLANT AND METHOD FOR OPERATING IT

CROSS REFERENCE TO OTHER APPLICATIONS

The present application is a continuation of German Patent Application No. 102 32 423.9, filed Jul. 17, 2002.

The invention relates to a method of operating a wind turbine, wherein rotor windings of an induction generator, which comprises stator coils coupled to a voltage grid, fed or supplied with rotor currents by a feed-in or supply unit are driven by a rotor of the wind turbine; wherein the frequencies of the fed-in or supplied rotor currents are controlled depending on the rotor rotation frequency and the feed-in unit is electrically decoupled from the rotor windings in the case predetermined variations of the grid voltage amplitude as well as a wind power plant operable with such a method.

Wind power plants are subject to extreme and short-term fluctuations of the availability of primary energy due to wind gusts. For this reason, usually variable speed generators are used for generating electric power by means of wind power plants since, when using such generators, the energy of wind gusts is not immediately supplied to the grid but can be stored in the centrifugal masses of the wind power plant by variation of rotational speed. In this manner, the mechanical loads on the wind power plant can be substantially reduced compared to plants with fixed rotational speed and the mechanical parts can be designed and manufactured lightweight and with reduced costs. Induction generators are usually used as variable speed generators, wherein their stator coils are directly coupled to the voltage grid and their rotor windings are driven by the rotor of the wind power plant and are supplied with rotor currents by means of suitable converters. Therein, the frequencies of the supplied rotor currents are controlled in a manner that the sum of the rotor rotational frequency and the rotor current frequency is permanently equal to the grid frequency. For feeding the rotor windings, direct converters coupled to the grid as well as intermediate voltage circuit converters with a grid-sided grid converter and a rotor power converter coupled thereto via an inductive and/or capacitive reactance can be used.

When using direct converters as well when using intermediate voltage circuit converters, the problem arises that large voltage differences between grid and stator coils occur on variations of the supply voltage amplitudes caused in the grid by, e.g., short circuits. These differences cause, in turn, a strong current rise in the stator coils directly coupled to the grid. These strong current rises in the stator coils are caused because the induction generator is usually fully excited at the variation of the grid frequency amplitude and mechanical energy is permanently supplied by the rotor. The strong current rise occurring in the stator coils on variations of the supply voltage leads to high induction voltages in the rotor windings, which can, in turn, cause damages on the converters used for feeding the rotor current. When using an intermediate voltage circuit converter, the inverse diodes of the rotor power converter can be totally destroyed due to the high currents caused by the voltages induced in the rotor windings. For this reason, in prior known methods for operating a wind power plant with an induction generator, the feed-in unit used for feeding the rotor currents is usually decoupled from the rotor windings on variations of the intermediate circuit voltage, particularly on supply voltage drops caused by short-circuits, to thereby prevent damage of the feed-in unit or converter, respectively, due to the voltages or currents induced in the rotor windings. After stabilizing the supply voltage, the feeding of the rotor current is resumed in the prior known methods for excitation of the induction generator and renewed synchronization with the grid. Such methods are described, e.g., in "Siemens—Energietechnik 5" (1983) vol. 6, pages 364-367: "Einsatz einer doppelt gespeisten Asynchronmaschine in der Großen Windenergieanlage Grovian". The disclosure of this document regarding the decoupling a converter from the rotor windings is hereby explicitly incorporated by reference into the present description. The duration of the interruption of operation of the induction generator between the supply voltage drop which may lead to a drop of the supply voltage amplitude down to 15% of the desired value, and the recovery of the supply voltage to, e.g., 80% of the desired value is usually only a few seconds so that the loss caused by the interruption does not substantially reduce the overall efficiency of the wind power plant.

With the increasing use of regenerative sources of energy, e.g. wind power plants, for electric power production, the problem arises that the duration of supply voltage drops substantially increases since not enough power can be provided to quickly stabilize the supply voltage after voltage drops caused, e.g., by a short-circuit.

In view of these problems in the prior art, it is an object of the invention to provide an improvement of the known methods for operating a wind power plant, which improvement can be used for stabilizing the supply voltage after voltage drops without jeopardizing the electrical components of the wind power plant, as well as to provide a wind power plant capable of executing such methods.

Regarding the method aspect, this object is solved by an improvement of the known methods for operating a wind power plant which is substantially characterized in that the feeding of the rotor current is resumed after the decoupling of the feed-in unit caused by the variation of the supply voltage amplitude as soon as the currents created in the rotor windings by this variation have dropped to a predetermined value.

This improvement relates to the finding that high currents induced in the rotor windings at a supply voltage drop diminishes and/or dies out after decoupling of the converters that are used for feeding the rotor currents, e.g. by short-circuiting the rotor windings via a resistor having a low impedance within 50 to 150 msec so that the feeding of the rotor current can be resumed after this short term without jeopardizing the converters. When additionally taking into account the fact that even in the case of a supply voltage drop to 15% of the desired value, a reliable sensing of phase position and zero crossings is possible. The controlled feeding operation of the wind power plant to the grid can be resumed via respective control of the amplitude and phase position of the supplied rotor currents immediately after the reduction of the currents induced in the rotor windings. Thereby, the wind power plant contributes to the stabilization of supply voltage, which can remain at a value of about 15% of the supply voltage for a time period of 500 msec so that a time period of more than 300 msec remains after the induced currents diminish and/or die out in the rotor windings. Within this time, the wind power plant can contribute to the stabilization of supply voltage before the supply voltage increases again and leads to a new rise of the currents induced in the rotor currents which may render necessary a new decoupling of the feed-in unit or converters, respectively, from the rotor windings for preventing damage.

During this time period a multiple of the plant's nominal current can be fed into either the grid or the short-circuit that causes the supply voltage drop.

Basically, resuming the feeding of rotor current can be accomplished under consideration of a predetermined time constant. In view of an increase in plant safety, it has been shown particularly expedient that when the rotor current is sensed as a two or three-phase signal or the rectified current is sensed as a single-phase signal and the current that was sensed drops to a pre-determined value, the feeding of the rotor current is resumed. Current transformers (e.g. current-compensated transformers) can be used for sensing the currents.

One must take into consideration a rise of the supply voltage amplitude to the desired value within less than a millisecond on recurrence of the supply voltage. Thereby, a DC voltage and a 50 Hz AC voltage can be induced in the rotor and may thus make necessary a new decoupling of the rotor windings from the feed-in unit, e.g., by short-circuiting of the rotor windings. The generator is partially de-energized via the quasi short-circuited rotor windings. The consequence is that the DC component is reduced, and the 50 Hz AC component is effective, depending on the actual rotational speed. If the speed of the wind power plant was in the subsynchronous range at the time of the supply voltage drop (occurrence of grid undervoltage), the recurrence of the supply voltage leads to an attempt of the short-circuited engine to ramp-up to the synchronous speed in a motor mode. This means that the wind power plant can obtain current when the supply voltage returns. If the speed of the wind power plant was in the supersynchronous range at the time of the supply voltage drop (ocurrence of grid undervoltage), the recurrence of the supply voltage causes the short-circuited engine to ramp-down to the synchronous speed in a generator mode. This means that the wind power plant supplies current when the supply voltage returns. When the amplitude of the rotor current has dropped sufficiently after 100 to 200 msec, the feeding of the rotor current can be resumed on recurrence of the supply voltage within the framework of the method according to the invention.

As has been explained above, it has been shown within the framework of the invention to be particularly advantageous that the rotor windings are short-circuited for decoupling from the feed-in or supply unit so that the currents induced in the rotor windings can diminish particularly rapidly. Therefore, a so-called "crow bar" can be used which short-circuits the rotor windings via a resistor of low impedance, particularly an impedance, and reduces the excitation of the engine. For example, the crow bar can be realized in the form of a partially controlled B6 bridge. When an intermediate voltage circuit converter is used, the rotor current converter can be simultaneously blocked while the grid converter remains connected to the grid and supplies apparent power. As is explained above, in this case the rotor and the starter current diminish within 50 to 150 msec depending on the resistance.

In a preferred embodiment of the present invention, the control device is designed for controlling the amplitude and/or phase position of the currents induced in the rotor windings. The active and reactive power of the induction generator can be controlled independent from each other by varying the phase position.

In the following, the invention is described with reference to the drawings to which the reader is explicitly referred to for every detail which may be essential for the invention but is not explained in detail within the description. In the drawings, FIG. 1 shows a basic circuit diagram of a wind power plant according to the invention with a double-fed induction generator and converter in the rotor circuit, FIG. 2 shows a typical variation in time of a supply voltage drop, and FIG. 3 shows a detailed view of the circuit diagram shown in FIG. 1.

According to FIG. 1, a wind turbine according to the present invention comprises a rotor 10 being rotatably arranged about a substantially horizontal rotor axis and being coupled to a an induction generator designated in total by reference numeral 30 via a gear box 20. The induction generator comprises stator coils 32 coupled to the grid as well as rotor windings 34 coupled to the rotor 10 via the gear box 20.

The rotational frequency of the rotor 34 is sensed by a sensor 40. Rotor currents are fed into the rotor windings by means of a converter which is designated in total with reference numeral 50. Converter 50 comprises a grid-sided grid converter 52 as well as a rotor-sided rotor converter 54 coupled thereto via a DC voltage circuit 56. Furthermore, a short-circuit element 60 which is formed as a so-called "crow bar" is provided, wherein the windings of the rotor 34 can be short-circuited via a resistor of low impedance. Sensor 40 sensing the rotational frequency of rotor 34 is connected to the rotor-sided rotor converter 54 to thereby allow for a control of the frequency of the currents fed in the rotor windings depending on the rotor's rotational frequency. Furthermore, a rotor filter 70 formed as a low-pass filter is connected between short-circuit element 60 and rotor converter 54. Additionally, a grid filter 71 is provided between grid converter 52 and the grid. Furthermore, a synchronization switch 72 is provided for synchronizing the wind turbine with the grid.

Figure 2:
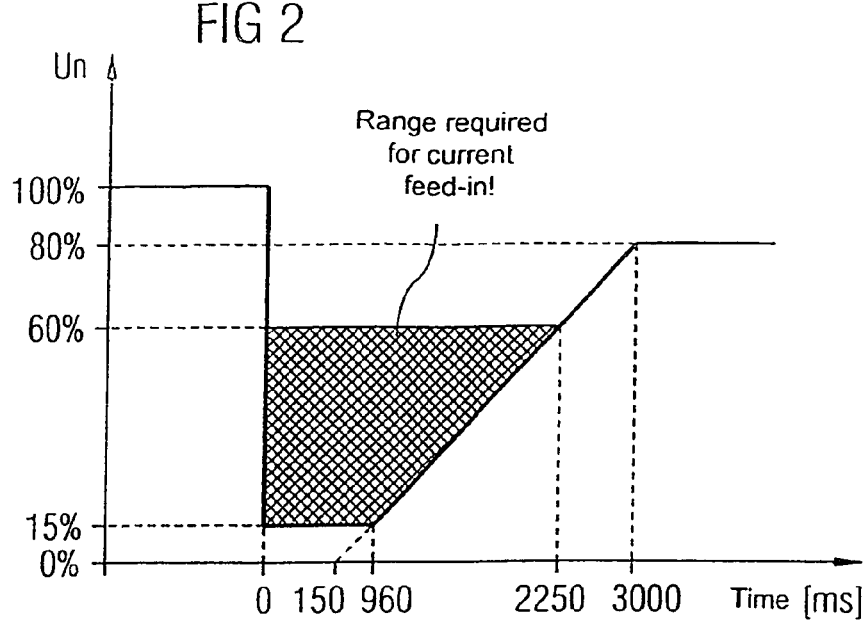
Figure 3:
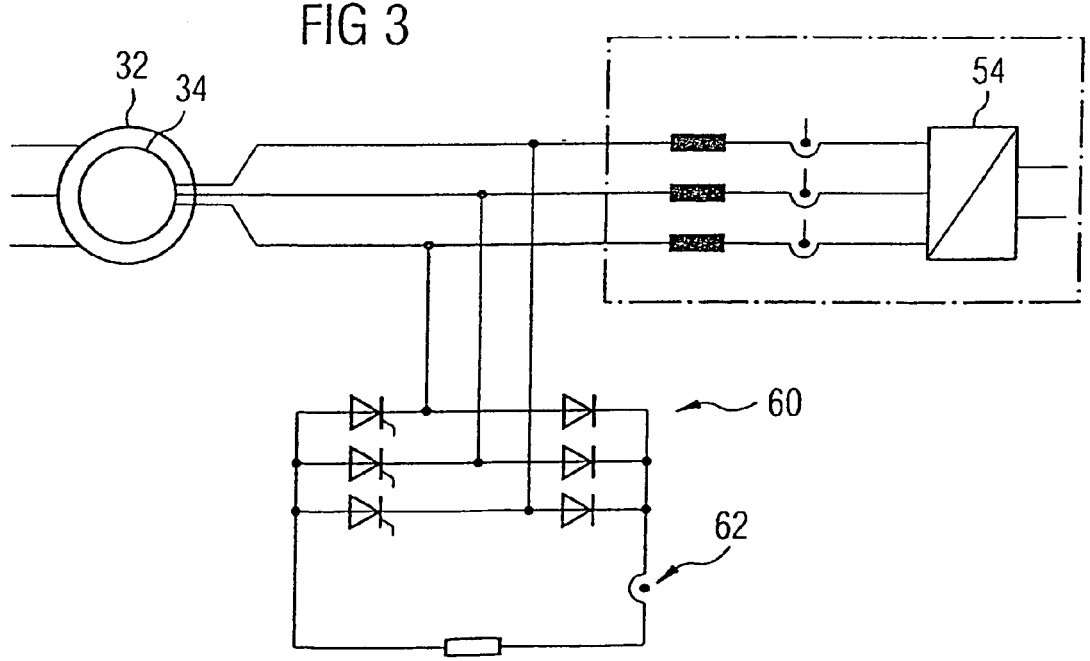

According to FIG. 2, a supply voltage drop has three phases. In a first phase, the supply voltage amplitude drops very rapidly in less than a millisecond down to a value of about 15% of the desired value. In a second phase having a duration up to 3 seconds, the supply voltage amplitude stays at this low value. Finally, in a third phase having a duration of 50-150 msec the supply voltage recurs to a value of about 80% or more of the desired value.

During the supply voltage drop in the first phase, converter 50, particularly the rotor-sided rotor converter 54, must be protected from damage due to currents induced in the rotor windings. For this reason, an emergency unit is provided in the wind power plant according to the embodiment of the present invention. This emergency unit can be operated to electrically decouple the feed-in unit, i.e. the converter 50, from the rotor windings 34. To this end, the emergency unit comprises a short-circuit element 60. Therefore, in case of emergency, e.g. on occurrence of a grid voltage drop, the rotor windings are short-circuited via short-circuit element 60 in this first phase and rotor converter 54 is blocked. After the die out of the induced currents in the rotor windings within 50 to 150 msec, the feeding of the rotor current via the rotor-sided rotor converter 54 is resumed by switching off the short-circuit element ("crow bar") and releasing the rotor current converter. To this end, the wind power plant according to the embodiment of the present invention comprises a release arrangement for releasing the rotor current feed-in after decoupling. When the currents generated in the rotor windings 34 and triggering the decoupling of converter 50 from the rotor windings have dropped to a predetermined value, the release arrangement releases the rotor current feed-in. Then, feeding of rotor currents is resumed. In the embodiment of the present invention, the release arrangement is comprised in short-circuit element 60. When the supply voltage recurs during the third phase, a new decoupling of the converter from the rotor windings can be accomplished if necessary to thereby prevent damage of the converter due to currents induced in the rotor windings during the recurrence of the supply voltage.

As is shown in FIG. 3, short-circuit element 60 ("crow bar") can be realized as a B6 bridge. In this case, the dying out of the rectified rotor currents can be accomplished via a current transformer resistor 62 in the B6 bridge. When the intermediate circuit voltage in converter 50 exceeds a predetermined value due to exceedingly high rotor currents, the crow bar formed as a B6 bridge is fired. Then, the same procedure as in the case of a short-circuit of the grid is executed. Should an exceedingly high current appear in the rotor due to a short-term undervoltage of the grid, the turbine really acts like in the case of a short-circuit of the grid. When the current drops afterwards to a predetermined value, the thyristors of the B6 bridge become blocked and the short-circuiting of the rotor windings 34 is ended. The feed-in of rotor currents is then resumed. Consequently, the thyristors form the release arrangement of the embodiment of the present invention.

The invention claimed is:

1. A method of operating a wind turbine, comprising:
   driving a rotor of the wind turbine by feeding rotor currents by a feed-in unit to rotor windings of an induction generator, which comprises stator coils coupled to a voltage grid;
   controlling the frequencies of the fed-in rotor currents depending on the rotor rotation frequency;
   electrically decoupling the feed-in unit from the rotor windings in the case of predetermined variations of the grid voltage amplitude by an emergency unit;
   releasing the fed-in rotor currents after electrically decoupling the feed-in unit using a release arrangement of the emergency unit; and
   when the rotor currents in the rotor windings by the variation have declined to a predetermined value, resuming the driving of the rotor of the wind turbine by feeding rotor currents by the feed-in unit to rotor windings of the induction generator after the decoupling caused by the variation of the grid voltage amplitude.

2. The method according to claim 1, wherein feeding rotor currents comprises feeding the rotor currents via a converter coupled to the grid voltage, wherein the converter is an intermediate DC voltage converter with a rotor-sided rotor current converter and a grid-sided grid converter.

3. The method according to claim 2, wherein during the decoupling the grid-sided grid converter remains coupled to the voltage grid and rotor-sided rotor current converter is blocked.

4. The method according to claims 1, 2, or 3,-wherein electrically decoupling comprises short-circuiting the rotor windings.

5. A wind turbine, comprising:
   a rotor with at least one rotor blade, the rotor being rotatably arranged with regard to a substantially horizontal rotor axis;
   an induction generator whose rotor windings are coupled to the rotor and whose stator coils can be coupled to a voltage grid;
   a feed-in unit for feeding currents into the rotor windings;
   a control unit for controlling the frequency of the fed-in currents depending on the rotor rotation frequency; and
   an emergency unit which can be operated to electrically decouple the feed-in unit from the rotor windings in case of variations of the grid voltage amplitude, wherein the emergency unit comprises a release arrangement for releasing the rotor current feed-in after decoupling, when the currents generated in the rotor windings by variation of the grid voltage amplitude triggering the decoupling are declined to a predetermined value.

6. The wind turbine according to claim 5, wherein the rotor is coupled to the rotor windings via a gear unit.

7. The wind turbine according to claim 5, wherein the feed-in unit comprises a converter coupled to the grid voltage.

8. The wind turbine according to claim 7, wherein the converter is an intermediate DC voltage converter with a rotor-sided rotor current converter and a grid-sided grid converter.

9. The wind turbine according to claim 5, wherein the emergency unit comprises a crow bar for short-circuiting the rotor windings.

10. The wind turbine according to claim 5, wherein the control unit is adapted for controlling the amplitude position and/or the phase position of the currents fed into the rotor windings.

11. The wind turbine of claim 6, wherein the feed-in unit comprises a converter coupled to the grid voltage.

12. The wind turbine of claim 11, wherein the converter is an intermediate DC voltage converter with a rotor-sided rotor current converter and a grid-sided grid converter.

13. The wind turbine of claim 6, wherein the emergency unit comprises a crow bar for short-circuiting the rotor windings.

14. The wind turbine of claim 7, wherein the emergency unit comprises a crow bar for short-circuiting the rotor windings.

15. The wind turbine of claim 8, wherein the emergency unit comprises a crow bar for short-circuiting the rotor windings.

16. The wind turbine of claim 6, wherein the control unit is adapted for controlling the amplitude position and/or the phase position of the currents fed into the rotor windings.

17. The wind turbine of claim 7, wherein the control unit is adapted for controlling the amplitude position and/or the phase position of the currents fed into the rotor windings.

18. The wind turbine of claim 8, wherein the control unit is adapted for controlling the amplitude position and/or the phase position of the currents fed into the rotor windings.

19. The wind turbine of claim 9, wherein the control unit is adapted for controlling the amplitude position and/or the phase position of the currents fed into the rotor windings.

* * * * *

INTER PARTES REEXAMINATION CERTIFICATE (907th)
United States Patent
Bücker et al.

(10) Number: US 7,321,221 C1
(45) Certificate Issued: Jul. 15, 2014

(54) METHOD FOR OPERATING A WIND POWER PLANT AND METHOD FOR OPERATING IT

(75) Inventors: Andreas Bücker, Hasbergen (DE); Wilhelm Janssen, Saterland (DE); Henning Lütze, Bad Bentheim (DE)

(73) Assignee: General Electric Company

Reexamination Request:
No. 95/001,272, Dec. 1, 2009

Reexamination Certificate for:
Patent No.: 7,321,221
Issued: Jan. 22, 2008
Appl. No.: 10/521,614
Filed: Feb. 10, 2006

(21) Appl. No.: 95/001,272

(22) PCT Filed: Jul. 17, 2003

(86) PCT No.: PCT/EP03/07776
§ 371 (c)(1),
(2), (4) Date: Feb. 10, 2006

(87) PCT Pub. No.: WO2004/008627
PCT Pub. Date: Jan. 22, 2004

(30) Foreign Application Priority Data
Jul. 17, 2002 (DE) .................................. 102 32 423

(51) Int. Cl.
*H02P 9/00* (2006.01)

(52) U.S. Cl.
USPC ................... 322/44; 322/25; 322/43; 322/54; 322/55

(58) Field of Classification Search
None
See application file for complete search history.

(56) References Cited

To view the complete listing of prior art documents cited during the proceeding for Reexamination Control Number 95/001,272, please refer to the USPTO's public Patent Application Information Retrieval (PAIR) system under the Display References tab.

*Primary Examiner* — Anjan K. Deb

(57) ABSTRACT

A method of operating a wind turbine, wherein the wind turbine may include rotor windings of an induction generator, which includes stator coils coupled to a voltage grid. fed with rotor currents by a feed-in unit are driven by a rotor of the wind turbine; wherein the frequencies of the fed-in rotor currents are controlled depending on the rotor rotation frequency and the feed-in unit is electrically decoupled from the rotor windings in the case predetermined variations of the grid voltage amplitude and the rotor current feed-in is resumed after the decoupling caused by the variation of the grid voltage amplitude, when the currents generated in the motor windings by the variation have declined to a predetermined value.

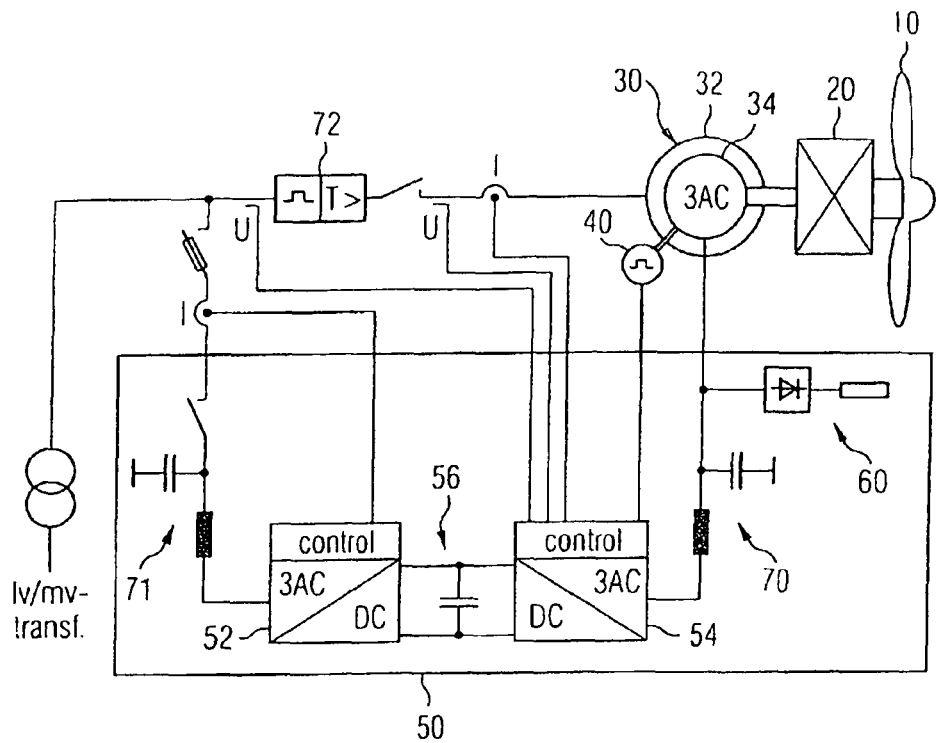

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-19 are cancelled.

\* \* \* \* \*